United States Patent
Hayashi et al.

(10) Patent No.: US 9,457,585 B2
(45) Date of Patent: Oct. 4, 2016

(54) PRINT APPARATUS, PRINT METHOD, AND SERIAL PRINTER

(71) Applicant: SEIKO EPSON CORPORATION, Tokyo (JP)

(72) Inventors: Takuma Hayashi, Nagano (JP); Naoki Sudo, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/324,547

(22) Filed: Jul. 7, 2014

(65) Prior Publication Data
US 2015/0054866 A1 Feb. 26, 2015

(30) Foreign Application Priority Data
Aug. 20, 2013 (JP) ................................ 2013-170035

(51) Int. Cl.
*B41J 2/205* (2006.01)
*B41J 2/045* (2006.01)
*G06K 15/10* (2006.01)
*G06K 15/02* (2006.01)
*H04N 1/405* (2006.01)

(52) U.S. Cl.
CPC ............. *B41J 2/205* (2013.01); *B41J 2/04516* (2013.01); *B41J 2/04551* (2013.01); *G06K 15/107* (2013.01); *G06K 15/1881* (2013.01); *H04N 1/4051* (2013.01)

(58) Field of Classification Search
CPC ............................ G06K 15/107; B41J 2/2052
See application file for complete search history.

(56) References Cited

U.S. PATENT DOCUMENTS

| | | | | |
|---|---|---|---|---|
| 6,149,264 | A | * 11/2000 | Hirabayashi | ......... B41J 2/04528 347/12 |
| 2003/0189728 | A1 | * 10/2003 | Jung | ............................ 358/3.06 |
| 2004/0136035 | A1 | * 7/2004 | Bartels | ......................... 358/3.14 |
| 2006/0007492 | A1 | * 1/2006 | Herron et al. | ................ 358/3.06 |
| 2006/0125865 | A1 | * 6/2006 | Shibata et al. | .................. 347/15 |
| 2006/0197989 | A1 | * 9/2006 | Herron | ......................... 358/3.06 |
| 2010/0123749 | A1 | * 5/2010 | Iritani et al. | .................... 347/14 |

FOREIGN PATENT DOCUMENTS

| | | | |
|---|---|---|---|
| JP | 2001-177722 A | | 6/2001 |
| JP | 2006168073 A | * | 6/2006 |
| JP | 2007-168202 A | | 7/2007 |
| JP | 2010-120185 A | | 6/2010 |

OTHER PUBLICATIONS

Machine-generated, English translation of JP2006-168073A, "Inkjet Printing System" to Shibata et al.; retrieved via http://www.ipdl.inpit.go.jp/homepg_e.ipdl on Jan. 14, 2014; 19 pp.*

* cited by examiner

*Primary Examiner* — Shelby Fidler
(74) *Attorney, Agent, or Firm* — Global IP Counselors, LLP

(57) ABSTRACT

A print apparatus that is configured to cause a print head provided with nozzles and a printing substrate to move relatively, eject an ink from the nozzles, and record dots onto the printing substrate includes a print control unit. The print control unit is configured to perform a control for ejecting the ink from the nozzles, and the print control unit modifies a proportion at which dots are formed adjacent to one another depending on an ejected amount of ink.

10 Claims, 13 Drawing Sheets

PRINT APPARATUS, PRINT METHOD, AND SERIAL PRINTER

CROSS-REFERENCE TO RELATED APPLICATIONS

This application claims priority to Japanese Patent Application No. 2013-170035 filed on Aug. 30, 2013. The entire disclosure of Japanese Patent Application No. 2013-170035 is hereby incorporated herein by reference.

BACKGROUND

1. Technical Field

The present invention relates to a print apparatus and a print method with which ink is ejected and halftone dots are printed.

2. Related Art

A print apparatus prints halftone dots corresponding to a predetermined image by ejecting ink from a print head. Herein, a "halftone" refers to an image constituted of dots that have different screen rulings, sizes, shapes, or densities. A halftone is generated by dithering, error diffusion, and the like. "Halftone dots" refers to the individual elements that constitute the tone. Halftone dots can have a variety of shapes, such as square, round, or elliptical. Halftone dots are also referred to as simply "dots" below.

In some instances, in the process of ejecting the ink, the ink separates into main droplets and satellites. In such an instance, the satellites may in some cases make impact and form dots at positions different from those of the main droplets. For this reason, in some instances the coverage rate, which is the proportion of printing substrate that is covered, may fluctuate due to the satellites, causing the image quality to be degraded. In recent years, a dispersed arrangement pattern of dots, where the dots are arranged in a dispersed manner, has become a standard practice, and the degradation of image quality caused by the satellites has a considerable impact.

There has therefore been disclosed a print apparatus for overlaying other dots onto the satellites by arranging the dots continuously in a main scan direction that intersects with a direction of feeding of the printing substrate. With such a print apparatus, the fluctuations in the coverage rate are curbed by having the satellites be overlaid onto the other dots. As a result, the degradation of image quality for the printed article can be reduced (for example, see Japanese Laid-open Patent Publication 2007-168202).

Causing many dots to overlap, as per the invention illustrated in the aforementioned Japanese Laid-open Patent Publication 2007-168202, does make it possible to obscure the satellites. New problems arise, however, in that the overlaid dots appear as a single lump of dots, or in that bleeding of the ink becomes readily apparent.

SUMMARY

The present invention has been created in view of the foregoing problems, and an objective thereof is to effectively curb the degradation of image quality caused by satellites.

In order to resolve the aforementioned problems, a print apparatus according to one aspect of the invention is configured to cause a print head provided with nozzles and a printing substrate to move relatively, eject an ink from the nozzles, and record dots onto the printing substrate and has a print control unit configured to perform a control for ejecting the ink from the nozzles. The print control unit modifies a proportion at which dots are formed adjacent to one another depending on an ejected amount of ink.

In the invention configured as described above, the print control apparatus controls the ejecting of the ink by the print head and modifies the proportion of dots that are formed adjacent to one another in accordance with the ejected amount of ink. For example, in a case where the proportion at which satellites are generated is higher in accordance with the ejected amount of ink, then increasing the proportion of dots formed adjacent to one another increases the number of dots overlaid with the satellites. As a result, it is possible to curb the change in the coverage rate caused by the occurrence of the satellites.

Herein, the ejected amount of ink refers to the ejected amount of ink per unit area of a desired printing substrate (in other words, the proportion of the number of pixels where dots are formed out of the number of pixels corresponding to a unit of surface area of the printing substrate). Hereinbelow, the ejected amount of ink is also simply called "duty". A case where a large amount of ink is ejected has a high duty, and a case where a small amount of ink is ejected has a low duty.

Also, one aspect of the invention may be a configuration where the print control unit increases the proportion of dots that are formed adjacent to one another as the ejected amount of ink becomes higher at an ejected amount of ink from 40% to 60%.

As a result of intensive research, the present inventors have clarified that in a range where the ejected amount of ink is 40% to 60%, the change in coverage rate caused by the occurrence of satellites becomes greatest. Therefore, in the invention configured as described above, it is possible to curb the degradation of image quality in the range of the ejected amount of ink where the change in coverage rate is greatest.

One aspect of the invention may be a configuration where the form of the dots being adjacent to one another is a dot column where two or more dots are adjacent to one another in a predetermined direction.

With the invention configured as described above, the change in coverage rate caused by the satellites can be curbed by a concentrated dot arrangement obtained when two or more dots are adjacent to one another.

One aspect of the invention may be a configuration where the print apparatus is a serial printer, and the predetermined direction is a direction in which the print head moves reciprocally.

With the invention configured as described above, it is possible to apply the invention in a serial printer, as well.

One aspect of the invention may be a configuration where the print control unit executes at least a first print mode for causing a dot column arrayed in a direction in which the print head moves reciprocally to be recorded in a plurality of scans, and a second print mode for causing the dot column arrayed in the direction in which the print head moves reciprocally to be recorded in a single scan, and in a case of performing recording where the ejected amount of ink is between 40% and 60%, the print control unit increases the proportion at which the dots are formed adjacent to one another in a case where the second print mode is being executed compared to a case where the first print mode is being executed.

The second print mode for causing a dot column arrayed in the direction in which the print head moves reciprocally to be recorded in a single scan is more susceptible to the occurrence of satellites than the first print mode for causing a dot column arrayed in the direction in which the print head moves reciprocally to be recorded in a plurality of scans. Therefore, in a case where the second print mode has been selected, the amount of occurrence of the dots is made to be greater than with the first print mode in a range where the ejection rate per unit area is 40% to 60%. It is therefore possible to apply the invention only to a print mode where the satellites more readily occur.

One aspect of the invention may be a configuration where, in a case where the second print mode is being executed, the print control unit uses a dither mask with which threshold values are recorded that are different from threshold values recorded in a dither mask used in a case where the first print mode is being executed.

With the invention configured as described above, known dither masks are appropriate to embody the invention, and therefore the invention can be implemented without making the processing more complicated.

Furthermore, one aspect of the invention may be a configuration where the print apparatus is a line printer and the predetermined direction is a direction in which the printing substrate is conveyed.

With the invention configured as described above, the invention can be applied to a line printer, as well.

One aspect of the invention may be a serial printer that is configured to cause a print head provided with nozzles and a printing substrate to move relatively, ejecting an ink from the nozzles, and record dots onto the printing substrate and has a print control unit configured to execute at least a first print mode for causing a dot column arrayed in a direction in which the print head moves reciprocally to be recorded in a plurality of scans, and a second print mode for causing a dot column arrayed in the direction in which the print head moves reciprocally to be recorded in a single scan. In a case of performing recording where the ejected amount of ink is between 40% and 60%, the print control unit increases a proportion at which the dots are formed adjacent to one another in a case where the second print mode is being executed compared to a case where the first print mode is being executed.

The technical concept as in the invention need not be realized only in the form of a print apparatus, but rather may be embodied by other forms. It would also be possible to understand the invention of a method (printing method) comprising a step corresponding to the feature of the print apparatus of any of the aspects described above, the invention of a print program for causing the method to be executed by a predetermined hardware (computer), or the invention of a computer-readable printing substrate on which the program is recorded. The print control apparatus may be realized by a single apparatus or may be realized by the combination of a plurality of apparatuses.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
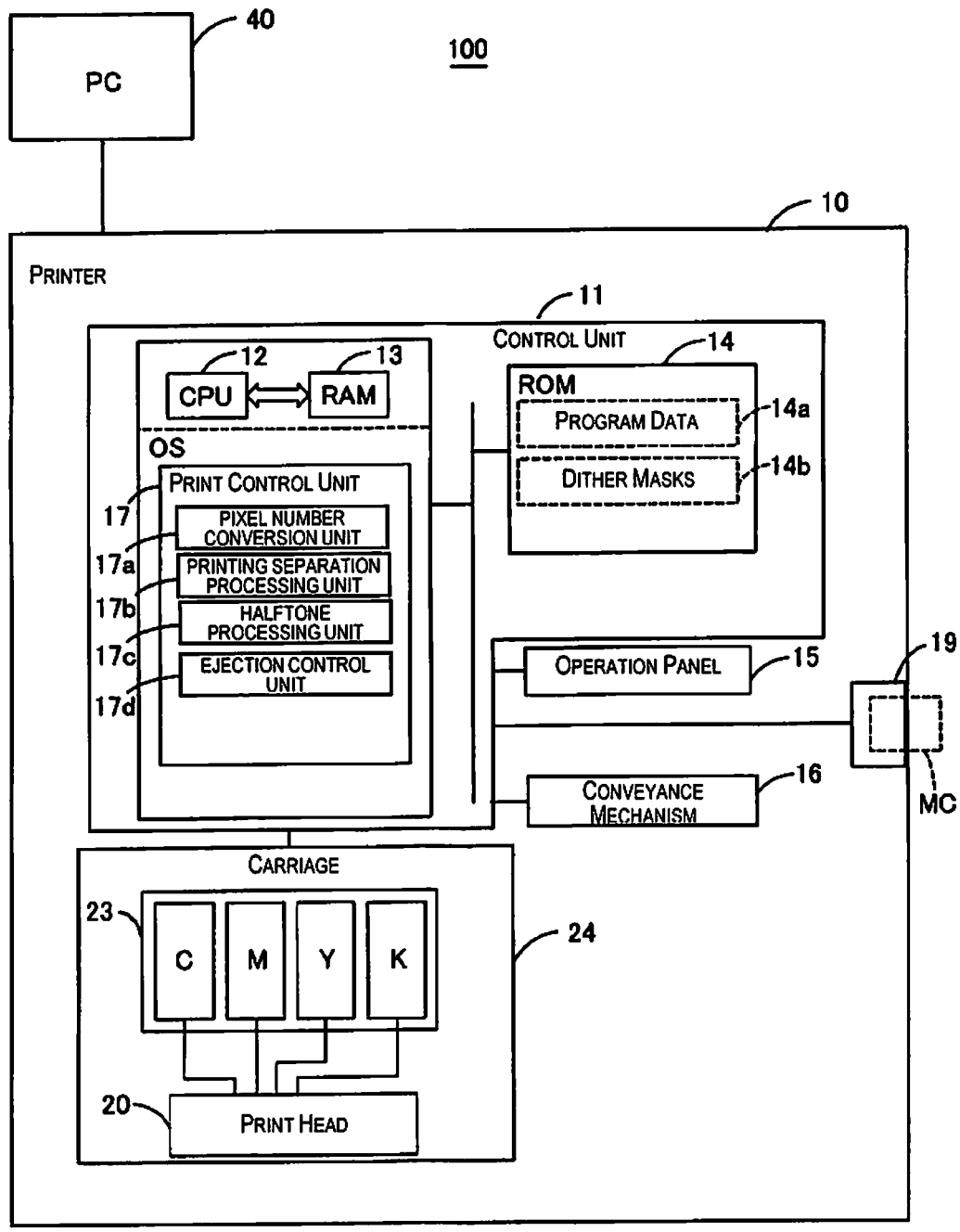
FIG. 1 schematically illustrates a hardware configuration and a software embodiment as in the present embodiment.
Figure 2:
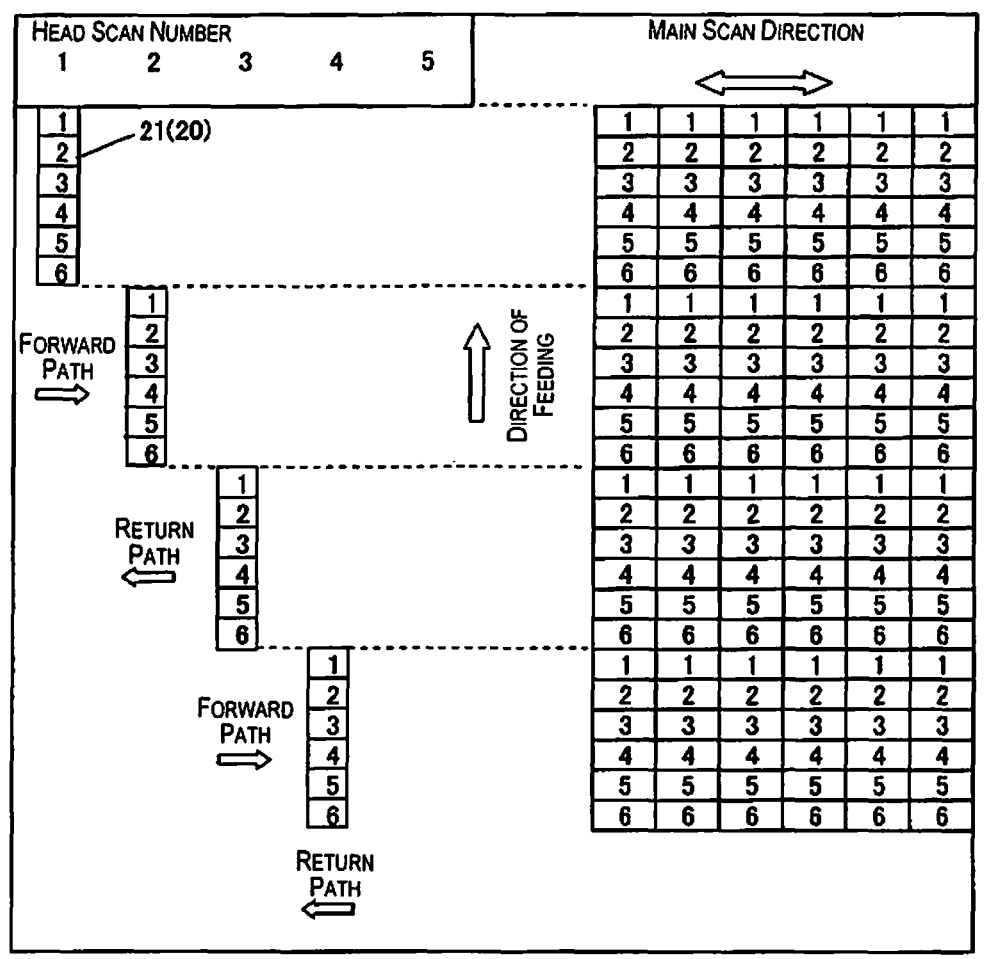
FIG. 2 illustratively exemplifies a part of each nozzle column for every color CMYK in an ejection hole surface 22 (a surface where openings of nozzles 21 are formed) of a print head 20, as well as dots that are printed onto a printing substrate by the nozzle columns.
Figure 3:
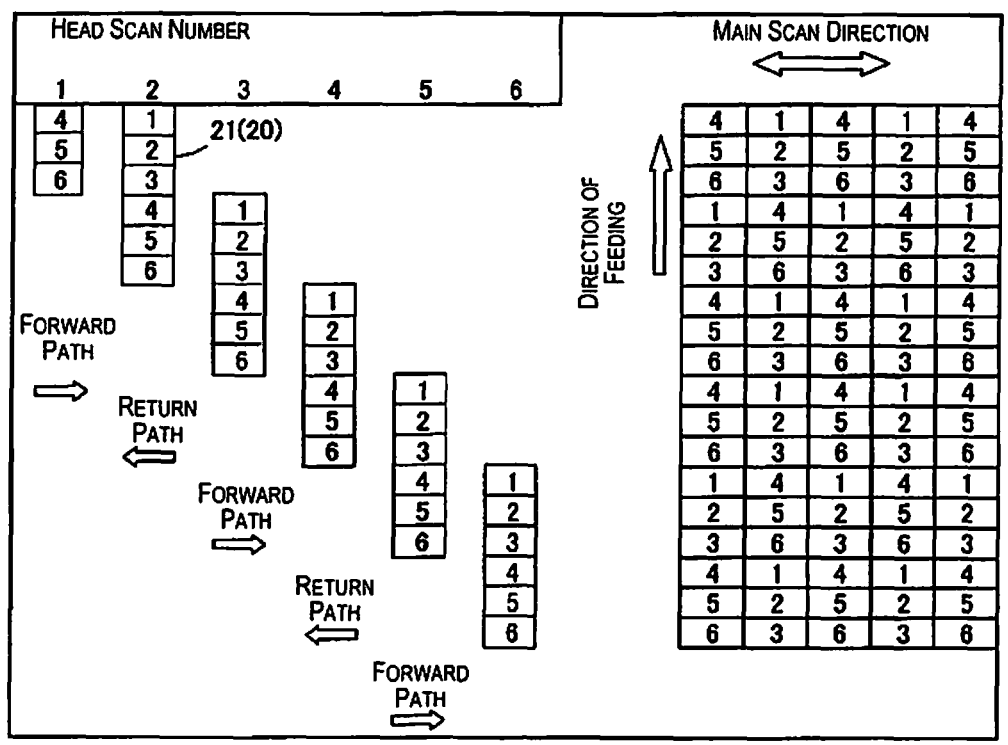
FIG. 3 illustratively exemplifies a part of each nozzle column for every color CMYK in the ejection hole surface 22 (a surface where openings of nozzles 21 are formed) of a print head 20, as well as dots that are printed onto a printing substrate by the nozzle columns.

The following is a description of embodiments of the present invention, in accordance with the sequence below.
First Embodiment
　Configuration of Print Apparatus
　Print Method
Second Embodiment
Variety of Modification Examples First Embodiment Configuration of Print Apparatus FIG. 1 schematically illustrates a hardware configuration and a software configuration as in the present embodiment. FIGS. 2 and 3 illustratively exemplify a part of each nozzle column for every color CMYK in an ejection hole surface (a surface where openings of nozzles 21 are formed) of a print head 20, as well as dots that are printed onto a printing substrate by the nozzle columns.

FIG. 1 illustrates a personal computer (PC) 40 and a printer 10. In the invention, a system constituted of the personal computer 40 and the printer 10 applies as a print apparatus. Additionally, the printer 10 may also be interpreted as being a print apparatus. Also, not only is there the case where the printer 10 and the PC 40 are separate configurations, but rather the two may be integrated.

A "printer" refers (JIS X0012-1990) to an output apparatus for making a hard copy recording of data, a principal form of which is discrete columns of graphic characters belonging to one or a plurality of previously established character sets. In many instances, a printer can also be used as a plotter. A "plotter" refers (JIS X0012-1990) to an output apparatus that directly creates a hard copy recording of data, in the form of a two-dimensional graph, onto a removable medium. An "inkjet printer" refers (JIS X0012-1990) to a non-impact printing apparatus wherein characters are formed by jetting particles or small droplets of ink on paper. One form of a dot printer prints an image or characters represented by a plurality of points formed by jetting particles or small droplets of ink.

The printer 10 has a control unit 11 for controlling print processes. The control unit 11 executes a variety of functions for controlling the apparatus with a CPU 12 that deploys program data 14a stored in a memory such as a ROM 14 to a RAM 13 and performing computations in conformity with the program data 14a in an OS. In the present embodiment, the control unit 11 executes realizes the functions of a print control unit 17 and the like on the basis of the program data 14a.

The print control unit 17 has functions of a pixel number conversion unit 17a, a printing separation processing unit 17b, a halftone processing unit 17c, an ejection control unit 17d, and the like. Each of these functions shall be described in greater detail below.

With the print control unit 17, for example, image data is inputted from the PC 40, recording media inserted into the printer 10 from the exterior, or the like, and data for setting forth the turning on and off of dots is generated by a halftone process from the image data. The data generated by the halftone process is below also discussed as "halftone data". It is then possible to realize printing that is based on this halftone data. The "recording media inserted into the printer 10 from the exterior" refers to, for example, a memory card MC, the memoir card MC being inserted into a slot section 19 formed in a housing of the printer 10. The print control unit 17 also allows for the inputting of designated image data from a variety of external machines, such as a scanner, a digital still camera, or a mobile terminal that has a wired or wireless connection to the printer 10, or such as a server that is connected over a network.

An "image" refers to a photograph, a picture, an illustration, a figure, text, or the like that is visible to the human eye, and refers to the act of properly representing the shapes, colors, and sense of perspective of an original. "Image data" signifies digital data for representing an image. Vector data, bitmapped images, and the like are included as applying as image data. "Vector data" refers to image data that is saved as a set of instructions and parameters for representing geometric shapes such as straight lines, circles, and arcs. A "bitmapped image" refers to image data that is described by an array of pixels. "Pixels" are the smallest element constituting an image to which a color and brightness can be independently assigned. Hereinbelow, in particular, "designated image data" is used to refer to image data for representing an image which the user has designated at will to be printed by the printer 10.

The printer 10 is equipped with an ink cartridge 23 for every one of a plurality of types of ink. The example in FIG. 1 is equipped with ink cartridges 23 that correspond to each ink for cyan (C), magenta (M), yellow (Y), and black (K). The specific type and number of liquid(s) used by the printer 10 is not limited to what is described above; it would be possible to use a variety of inks or liquids such as, for example, light cyan, light magenta, orange, green, gray, light gray, white, metallic ink, or precoat solution. The printer 10 is provided with the print head 20, which ejects (jets) from a plurality of nozzles 21 the ink that is supplied from each of the ink cartridges 23. The inks contained in the ink cartridges 23 may be a pigment ink or may be a dye ink. There may also be a mixture thereof.

The print head 20 in the first embodiment is a serial printer head. As such, the printer 10 is a serial printer. The print head 20 is moved reciprocally by a carriage 24 in a main scan direction (first direction) that intersects with a direction of feeding. Herein, "intersects with" has the meaning of "is orthogonal to". However, the term "orthogonal" referred to in the present specification does not signify only a rigid angle of 90°, but rather has a significance that encompasses an error of angle of an extent that is acceptable for the quality of the product.

The printing substrate (printing material) refers to a material for retaining a printed image. The shape is generally rectangular, but may in some instances be circular (for example, optical discs such as CD-ROMs and DVDs), triangular, quadrangular, polygonal, and so forth; at least all of the types of paper and paperboard products and processed products set forth in the Japanese Industrial Standard "JIS P0001:1998—Paper, board and pulp" are included.

The print control unit 17 generates a drive signal for driving the print head 20, a conveyance mechanism 16, or the like. The print head 20 is for ejecting ink onto the printing substrate. Nozzle columns for each of the colors CMYK of the print head 20 are arranged side by side along the main scan direction. The print head ejects the inks from the nozzle columns of each of the colors and thereby prints a desired image with dots for C, M, Y, and K overlaid onto the printing substrate.

The print control unit 17 is also able to cause the print head 20 to perform printing in two print modes (band printing and multi-pass) with which the frequency of ejecting ink is different. Herein, the "ejection frequency" is defined as being the number of droplets (of ink) ejected per unit time by the print head 20. FIG. 2 is a drawing that describes the concept of band printing. FIG. 3 is a drawing that describes the concept of multi-pass. In FIGS. 2 and 3, the configuration is one of a nozzle column for a single color, in order to facilitate description, and this nozzle column is constituted of six nozzles 21 arranged in the direction of feeding. In FIGS. 2 and 3, nozzle numbers (1, 2, 3, 4, 5, 6) are assigned in order to distinguish between each of the nozzles 21. The position of each of the dots recorded onto the printing substrate has assigned thereto the number of the nozzle that recorded the dot.

As is illustrated in FIG. 2, in band printing (a second print method), printing of a dot column arrayed in the main scan direction is completed with a single scan. In FIG. 2, the print head 20 prints dots of the six-dot width arranged in the direction of feeding in a single pass (scan).

That is to say, in a first scan, the dots of the six-dot width in the direction of feeding are printed by the nozzles 21 of the nozzle numbers 1 to 6 while the print head 20 is also moving on a forward path (in the right-side direction in the drawing). Next, in a second scan, dots of the six-dot width arrayed in the direction of feeding are printed with the nozzles 21 of the nozzle numbers 1 to 6 while the print head 20 is being moved on a return path (the left-side direction in the drawing). At this time, because the printing substrate is being conveyed in the direction of feeding, dots are, in the second scan, formed on an upstream side with respect to the dots that were printed in the first scan on the printing substrate. Thus, in the band printing, the print head 20 prints a plurality of columns of dots arrayed in the direction of feeding on the forward path and the return path each. Also, at this time, the printing of a dot column arrayed in the main scan direction is completed in one scan.

With multi-pass, however, a dot column arrayed in the main scan direction is printed with a plurality of scans (in FIG. 3, two scans). As illustrated in FIG. 3, in a first scan, the print head 20 is moved on the forward path (the right-side direction in the drawing) and, during this time, dots of a three-dot width in the direction of feeding are printed with the nozzles 21 of the nozzle numbers 4, 5, 6. At this time, the print head 20 prints odd-numbered dots in the main scan direction, and therefore even-numbered dots are not printed. Next, in a second scan, the print head 20 is moved on the return path (the left-side direction in the drawing) and, during this time, even-numbered dots in the main scan direction out of the dots of the six-dot width in the direction of feeding are printed with the nozzles 21 of the nozzle numbers 1 to 6. That is to say, the even-numbered dots that were not printed in the first scan are printed then in the second scan. Thus, with the multi-pass, the print head 20 prints a dot column arrayed in the main scan direction over a plurality of scans.

With the band printing, the ejection frequency is higher and the number of dots that are recorded in one scan is greater compared to the multi-pass. For this reason, the duration of printing can be curtailed in a case where the band printing is used. However, satellites are more likely to occur when the ejection frequency is higher. Conversely, with the multi-pass, the satellites are less likely to occur compared to the band printing.

Employing the band printing as a second print mode is merely one example, however. Also, having the dot width printed by the band printing in one scan be six dots is merely an example; any dot width printed with one scan is possible, provided that a dot column arrayed in the main scan direction is printed in one scan. Furthermore, the multi-pass employed as the first print mode also need not only print one dot column divided over two scans, but rather may also print the dot column in a plurality of scans two or greater in number.

The print head 20 may also be configured so as to be able to eject dots of a plurality of sizes (small dots, medium dots, and large dots) that have mutually different amounts of ink per dot.

The conveyance mechanism 16 is provided with a motor (not shown), a roller (not shown), and the like, and conveys the printing substrate along the direction of feeding by being subject to driving control by the print control unit 17. When the ink is ejected from each of the nozzles 21 of the print head 20, then dots are attached to the printing substrate that is being conveyed, and an image is thereby reproduced on the printing substrate on the basis of the halftone.

The printer 10 is further provided with an operation panel 15. The operation panel 15 comprises a display unit (for example, a liquid crystal panel), a touch panel formed inside the display unit, and a variety of buttons or keys, and accepts an input coming from the user, displays a required user interface (UI) screen on the display unit, and the like.

Figure 4A:
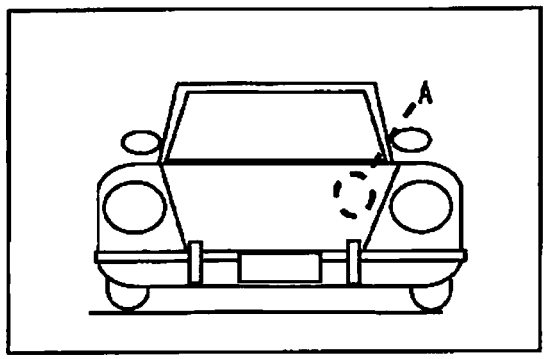
FIG. 4A illustrates an image that has been printed by a printer 10.
Figure 4B:
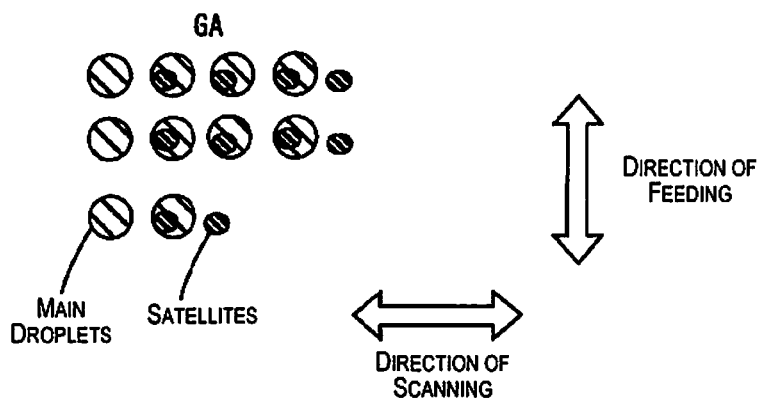
FIG. 4B illustrates an image that has been printed by the printer 10.
Figure 4C:
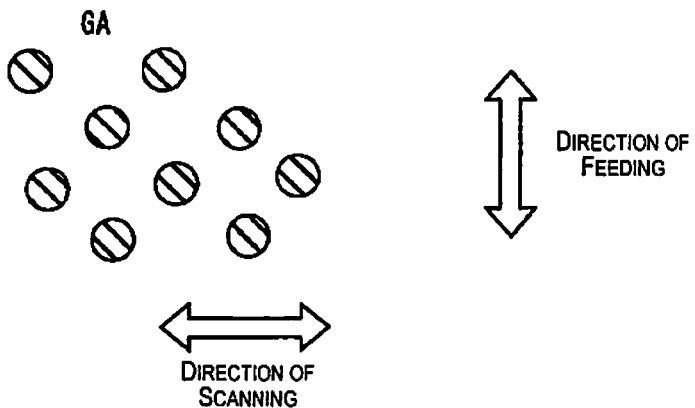
FIG. 4C illustrates an image that has been printed by the printer 10.

FIGS. 4A-4C illustrate images printed by the printer 10. FIG. 4A is a drawing illustrating a given designated image. FIGS. 4B and 4C are drawings providing an enlarged illustration of a region A of the designated image illustrated in FIG. 4A. FIG. 4C illustrates dots printed in the first print mode, and FIG. 4B illustrates dots printed in the second print mode.

FIGS. 4B and 4C are alike in that the region A of the designated image is reproduced by having dots be arrayed in a desired pattern. The arraying of the dots corresponding to the region A is herein below also referred to as an image region GA. In FIGS. 4A-4C, the designated image is constituted solely of black dots, for the sake of ease of understanding, but in reality dots that are cyan, magenta, yellow, and black are overlaid to constitute a desired designated image.

As illustrated in FIG. 4C, no separation of ink (that is to say, satellites) takes place in the image region GA printed in the first print mode (the multi-pass). As illustrated in FIG. 4B, however, separation of ink does take place in the image region GA printed in the second print mode (the band printing), and satellites make impact near where the main droplets make impact.

As illustrated in FIGS. 4A-4C, the differences between the print modes produce changes in the extent to which the satellites take place. Therefore, the degradation in image quality caused by the occurrence of the satellites is curbed by using a dot pattern that is rich in dots that are arrayed continuously in the main scan direction in a case where a print mode with which satellites are likely to take place is being applied. In FIG. 4B, causing there to be abundant dots that are arrayed continuously in the main scan direction has caused the satellites and the other dots to be overlaid with one another and made it more difficult to see the satellites.

Figure 5:
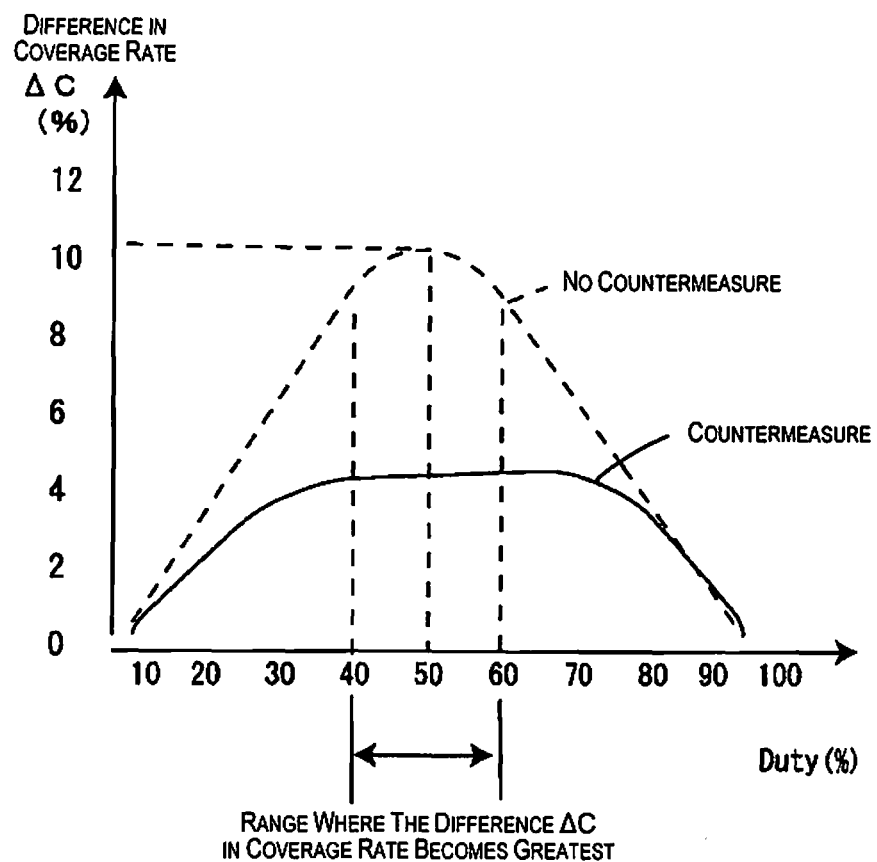
FIG. 5 is a graph that illustrates the relationship between a duty and a difference ΔC in the coverage rate.

Furthermore, as a result of their studies, the present inventors have found that at near where the duty is 50%, the of the degradation of image quality produced by the satellites reach a maximum and that therebelow, there is no increase in the factors that trigger the degradation of image quality even when the duty is increased, which shall be described on the basis of FIGS. 5 and 6.

Figure 6A:
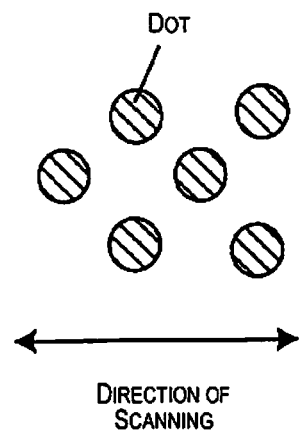
FIG. 6A is a drawing that illustrating the coverage rate, which changes depending on the duty.
Figure 6B:
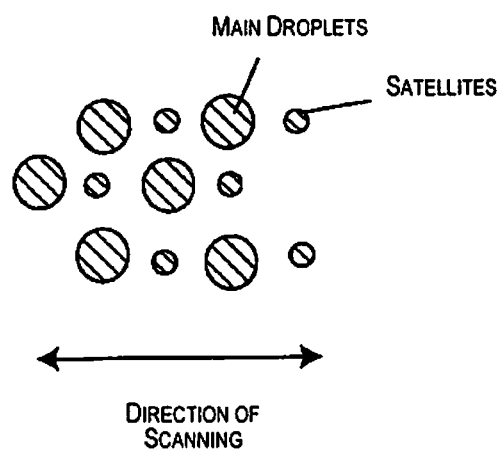
FIG. 6B is a drawing that illustrating the coverage rate, which changes depending on the duty.

FIG. 5 is a graph that illustrates the relationship between the duty and a difference $\Delta C$ in coverage rate. FIGS. 6A and 6B are drawings that illustrate the coverage rate, which changes in accordance with the duty. Herein, the "difference $\Delta C$ in coverage rate" is a percentage indicative of the difference $\Delta C$ between a coverage rate C1 and a coverage rate C2, where C1 is the coverage rate of a case where the dots make impact at the ideal positions and C2 is the coverage rate of the dots in a case where satellites take place. The "coverage rate" is indicative of the surface area (covered with dots of a single color) on which dots of a single color are printed, with respect to the printing substrate per unit surface area.

FIG. 5 illustrates the duty as the horizontal axis and illustrates the difference $\Delta C$ in coverage rate as the vertical axis. The dashed line illustrates the relationship between the difference $\Delta C$ in coverage rate and the duty that is conventional (that is to say, when a countermeasure for satellites has not been applied). The solid line illustrates the relationship between the difference $\Delta C$ in coverage rate and the duty in a case where the satellite countermeasure of the invention has been applied. In both cases, the dots are formed with a printing method with which the ejection frequency is high, i.e., the band printing.

As illustrated in FIG. 5, in the conventional (dashed line) graph, the difference $\Delta C$ in coverage rate increases as the duty increases in a range where the duty is from 0% to 50%. This fact shall now be described with reference to FIGS. 6A and 6B. FIGS. 6A and 6B describe the changes in coverage rate that occurs because of the satellites. FIG. 6A illustrates the dots of a case where satellites do not occur. FIGS. 6B and 6C illustrate the dots of a case where satellites do occur.

In FIG. 6A, no separation of the ink takes place, and satellites do not occur. In FIG. 6B, however, the satellites do occur, in addition to the main droplets, and the coverage rate is increased. That is to say, in a comparison between FIG. 6A and FIG. 6B, a difference in the coverage rate has occurred because of the satellites. With serial printers in particular, satellites tend to be likely to be generated in the main scan direction with respect to the main droplets.

As illustrated in FIG. 5, however, at a duty of 50% or higher, the difference ΔC in coverage rate is not increased but in fact is actually reduced even when the duty is increased. This is because at a duty of 50% or higher, though the satellites may be generated, there is a higher possibility of these satellites making impact in a region where other dots have been formed, thus reducing the difference ΔC in coverage rate.

The invention changes the technique of countering the satellites, with a focus on the relationship between the duty and the difference ΔC in coverage rate (variation in coverage rate). Namely, the countermeasure is performed so that the effects of the satellites are reduced most in a rage where the duty is 40% to less than 60%, at which the difference ΔC in coverage rate becomes greatest, but in the remaining ranges, the extent of the countermeasure is changed depending on the difference ΔC in coverage rate.

Print Method

Figure 7:
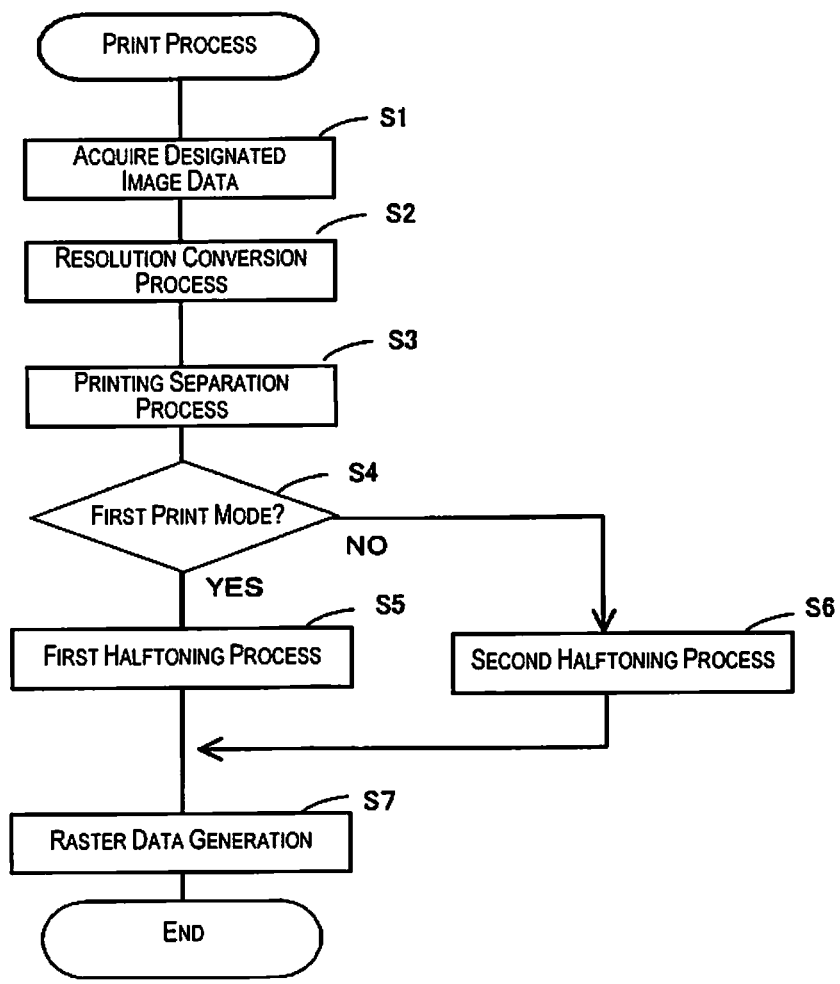
FIG. 7 illustrates, with a flow chart, a print control process for printing an image that is performed in the aforementioned configuration.

FIG. 7 is a flow chart that illustrates the print control process for printing an image that is performed in the configuration described above. The aforementioned countermeasure against the satellites, depending on the duty, is performed by this print control process.

In step S1, the print control unit 17 acquires designated image data when a command to print an image is received from the user via the operation panel 15. The designated image data is acquired by the print control unit 17 from a desired information source such as the PC 40, storage media, or an external machine.

In step S2, the pixel number conversion unit 17a converts the resolution of the designated image data to a resolution that can be printed by the print head 20. As one example, in the present embodiment, in a case where the resolution of the designated image data is 360 dpi×360 dpi, then the pixel number conversion unit 17a multiples one pixel of the designated image data by 100 (10×10).

Herein, the number of pixels, after the resolution conversion, that corresponds to one pixel of the original designated image data varies depending on a quantization number in halftoning (described below) and a variety of factors. Therefore, the multiplying of one pixel by 10×10 is merely one example. Hereinbelow, for the sake of ease of description, the description shall be continued with the understanding that one pixel of the original designated image data corresponds to 10×10 (100) pixels.

In step S3, the printing separation processing unit 17b performs a print separation process on the designated image data. In other words, the color representation system of the designated image data is converted to an ink color representation system used by the printer 10. For example, in a case where the designated image data represents the color of each of the pixels with an RGB value, then the RGB values are converted to a gradation value (a value from 0 to 255) of CMYK each, for every pixel, and ink amount data is thereby obtained. The color conversion process of such description can be executed by consulting a desired color conversion lookup table.

In step S4, a determination is made regarding the print mode with which printing is to be performed thenceforth. Through a UI screen, the user is able to select the second print mode where priority is given to the time required for printing and the firs print mode where priority is given to image quality.

In a case where the print mode is the first print mode, then the satellites are less likely to occur because the printing is performed with the multi-pass. Therefore, in a case where the first print mode is selected, the dispersiveness of the dots forming the designated image is increased and the image quality is improved. Herein, the dispersiveness of the dots signifies the relationship of the distance between dots printed onto the printing substrate, where having a high dispersiveness signifies that the distance between dots printed in a given region has reached a predetermined interval. Conversely, having a low dispersiveness signifies a case where the distance between dots is narrow.

In turn, in a case where the print mode is the second print mode, then the satellites become more likely to occur because the printing is performed by the band printing. Therefore, the satellites are obscured by lowering the dispersiveness of the dots.

Figure 8:
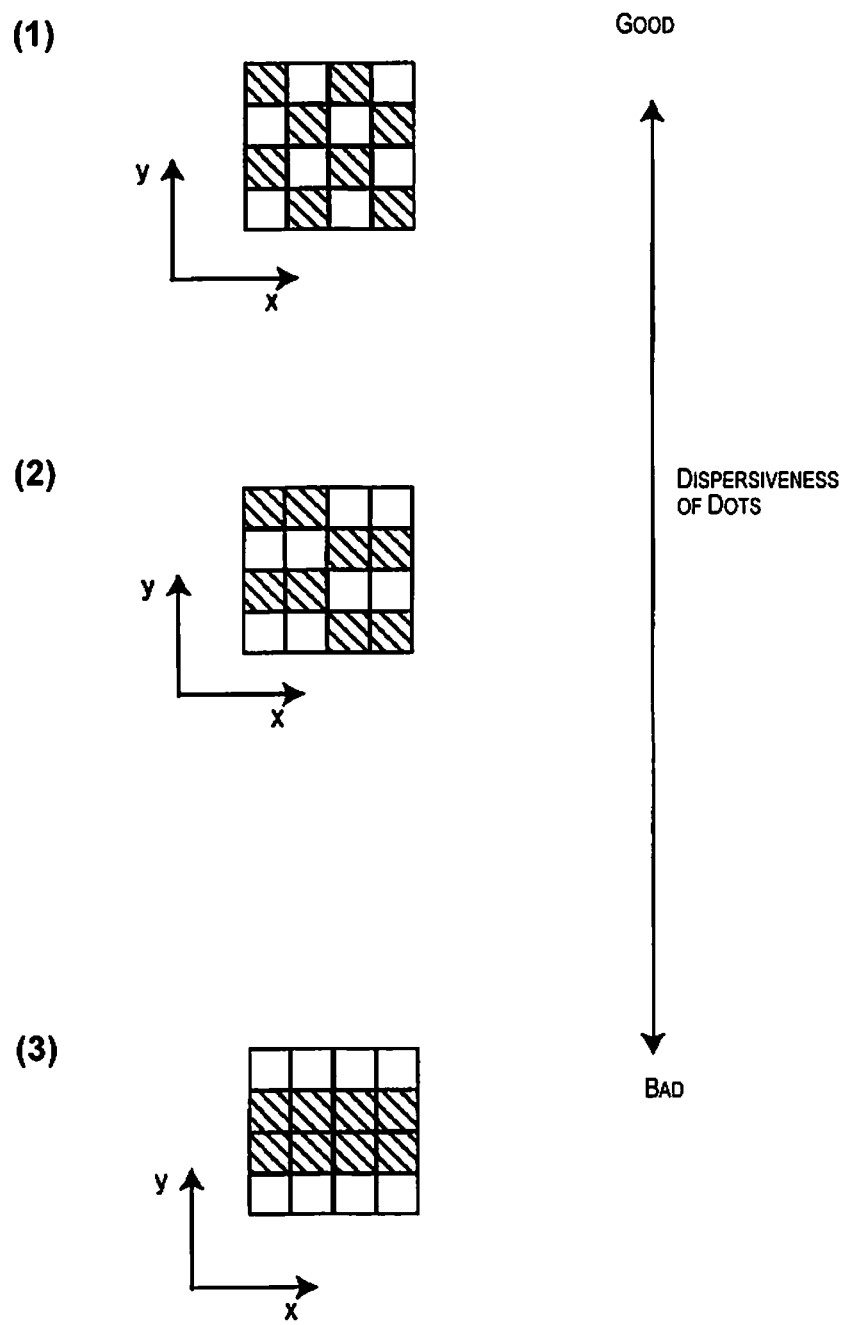
FIG. 8 is a drawing for describing the dispersiveness of the dots.

FIG. 8 is a drawing for describing the dispersiveness of the dots. FIG. 8 illustrates a plurality of dot patterns for reproducing a duty (for example, where the amount of ink is 128) of 50% in 4×4 pixels. Going from (1) to (3) of FIG. 8, the dispersiveness of the dots is increasingly lower. In (1) of FIG. 8, where the dispersiveness of the dots is highest, the dots are not arranged in series with one another in any direction, neither the X-direction (the direction corresponding to the main scan direction) nor the Y-direction (the direction corresponding to a secondary scan direction), and the pattern is a so-called staggered array.

As the dispersiveness of the dots becomes increasingly poorer, so too is there an increase in the number of dot patterns configured with the dots arranged in series with one another; in (3) of FIG. 8, where the dispersiveness is lowest, all eight dots are arranged concentrated at the middle.

In a case where the user has selected the first print mode (step S4: YES), then in step S5, the halftone processing unit 17c performs a first halftone process on the printing separation-processed image data. From consecutive data of 0 to 255, the halftone process generates binarized halftone data for stipulating the formation of a dot (dot-on) or non-formation of a dot (dot-off) for every pixel. For example, data indicative of combinations of dot-on and dot-off for reproducing a gradation, corresponding to the gradation values (0 to 255) of pixels of interest, is designated for a sub-pixel group (10×10 pixels) corresponding to one pixel of the designated image data. The halftone data generated in this step S4 is constituted of a dot array having a high dispersiveness, illustrated in (1) of FIG. 8. In a case whether a dither method is used in the first halftone process, then halftone data for reproducing dots of a known dispersion type, such as a blue noise mask, a Bayer-type dither, or random noise dithering, is formed.

It shall be readily understood that in addition thereto, a case where the print head 20 is able to modify the size of the dots may be one for forming multi-value-converted halftone data composed of "large dots", "medium dots", and "small dots".

In a case where the user has selected the second print mode (step S4: NO), then in step S6 the halftone processing unit 17c performs a second halftone process on the printing separation-processed image data. In the second halftone process executed in step S6, the halftone data is formed such that the dispersiveness of the dots that are printed onto the printing substrate is lower than with the first halftone process.

In the present embodiment, different dither masks corresponding to the two types of print mode are recorded in the ROM 14 in order for the print apparatus 100 to reproduce the different dot patterns depending on the print mode. That is to say, the halftone processing unit 17c selectively uses a dither mask depending on the print mode, and halftone data that differs in the dispersiveness of the dots is thereby generated.

Though a description is omitted, dither masks corresponding to the same print mode are constituted of a plurality of dither masks corresponding to each of the colors (cyan, magenta, yellow, and black). Therefore, the halftone process illustrated in the present embodiment is to be applied in all of the colors (cyan, magenta, yellow, and black) belonging to the printer 10.

Figure 9:
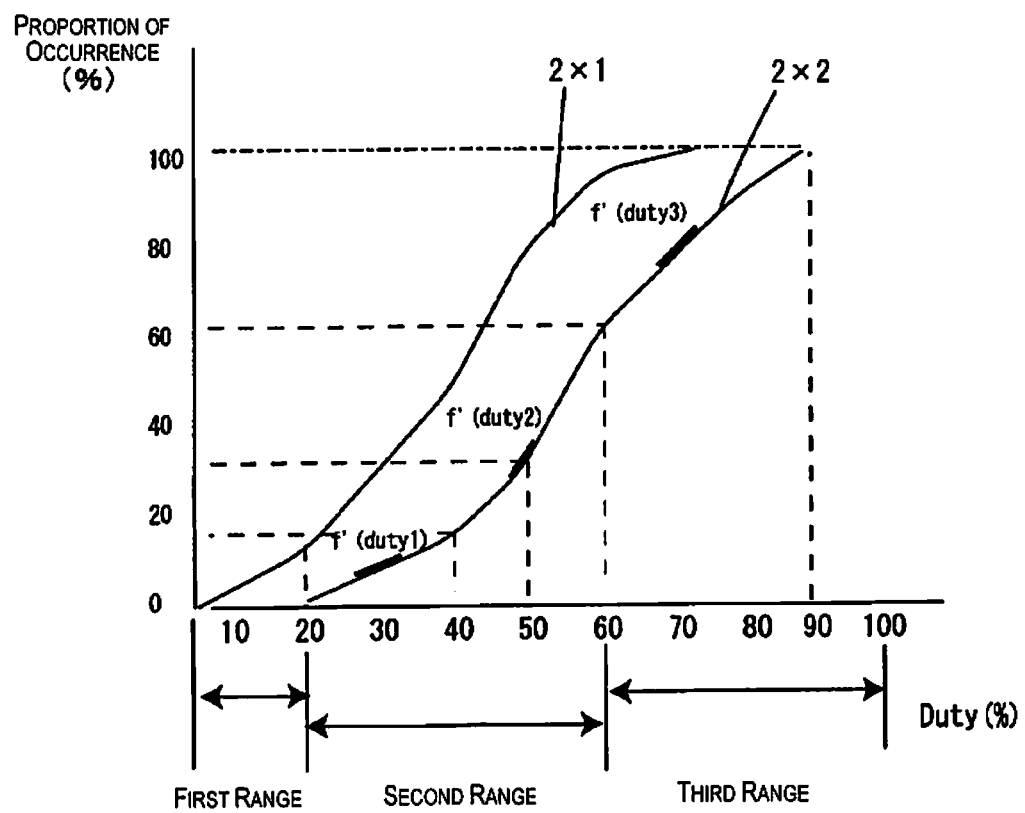
FIG. 9 is a graph for describing the relationship of dither patterns generated by dither masks.

FIG. 9 is a graph for describing the relationship of dither patterns generated by dither masks. In FIG. 9, the horizontal axis indicates the duty and the vertical axis indicates the proportion of occurrence of two types of dot patterns (2×1 and 2×2). Herein, the proportion (percentage) of occurrence indicates the proportion of each of the dot patterns (2×1 and 2×2) that is included in all of the dot patterns (100%) reproduced in accordance with a given duty. The reason for why the sum of the proportion of 2×2 dot patterns and the proportion of 2×1 dot patterns exceeds 100 in the graph is as follows. Namely, the 2×2 dot patterns could also be determined to be two 2×1 dot patterns that have been arrayed in the direction of feeding, and therefore the graph has been formed in FIGS. 10A and 10B such that in association with the occurrence of the 2×2 dot patterns, the 2×1 dot patterns also occur. Though a description has been omitted, the same also applies to cases where the 2×1 dot patterns are included in the other dot patterns. With no exception, 100 is the upper limit for the sum of the proportion of occurrence of each of the dot patterns that occur in correspondence with a given duty.

Therefore, what is certain in FIG. 9 is that as the duty increases, there an increase in the proportion of occurrence of the 2×2 dot patterns.

In a case where the duty is less than 20% (a first range), then the dot patterns generated by the dither mask include only the 2×1 dot patterns; the 2×2 dot patterns are not generated. Herein, the duty is determined on the basis of the gradation value (ink amount data) stipulated for every pixel of the designated image data. The reason for why the 2×2 dot patterns are not generated at a duty less than 20% is that at a duty less than 20%, the designated image is a pale image, and therefore were the 2×2 dot patterns to be generated, the dot patterns would be more easily recognized and would adversely affect the graininess.

In a case where the duty is 20% to less than 60% (a second range), the dot patterns generated by the dither mask include the 2×2 dot patterns and the 2×1 dot patterns. In the present embodiment, in this second range, the dot patterns generated by the dither mask have an amount of 2×2 dot patterns generated that increases as the duty increases. Using the 2×2 dot patterns makes it possible to increase the establishment of the dots overlapping with the satellites.

In the present embodiment, in particular, in a range where the duty is 40% to 60%, the dither mask most increases the amount of occurrence of the 2×2 dot patterns. That is to say, the slope f′(duty2) of the graph illustrating the amount of occurrence of the 2×2 dot patterns in FIG. 9 is higher than the slopes of the graph in the other ranges (f′(duty1), f′(duty3)). Herein, f(duty) is a function representative of a graph illustrating the amount of occurrence of the 2×2 dot patterns illustrated in FIG. 9. duty1, duty2, and duty2 indicate the values of the duty in the first through third ranges, respectively.

Therefore, the dither mask generates the 2×2 dot patterns in abundance between 40% and 60%, including the duty 50% where the difference ΔC in coverage rate illustrated in FIG. 5 reaches a maximum. The result is that the change in coverage rate caused by the satellites is curbed by the 2×2 dot patterns.

In a case where the duty is 60% or higher, then there is little variation in the coverage rate caused by the occurrence of the satellites, and therefore any manner of dot pattern may be generated by the dither mask. For example, in this third range, the dither mask may be one that generates dot patterns in consideration of the dispersiveness of the dots.

In the present embodiment, the dither mask used in a case where the second print mode is being executed has recorded therefor a threshold value that is different from a threshold value recorded for the dither mask used in a case where the first print mode is being executed. One example of the principles of the dither mask applied in the second print mode shall now be described below with reference to FIGS. 10A and 10B.

Figure 10A:
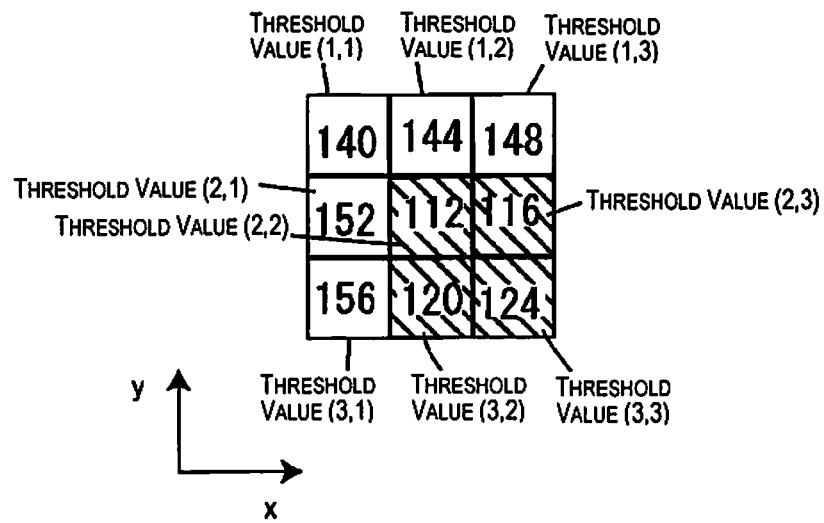
FIG. 10A is a drawing illustrating one example of a concentrated-dot dither mask applied to 3×3 pixels.
Figure 10B:
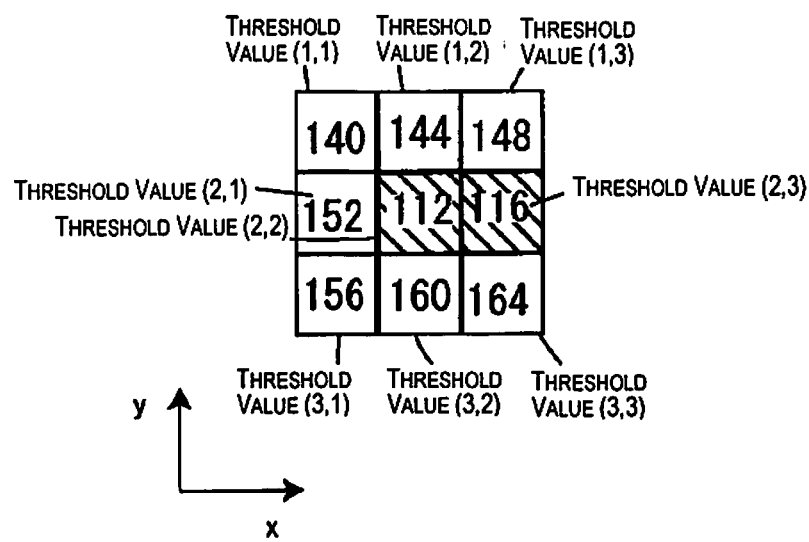
FIG. 10B is a drawing illustrating one example of the concentrated-dot dither mask applied to 3×3 pixels.

FIGS. 10A and 10B are drawings illustrating examples of a concentrated-dot dither mask that is applied to 3×3 pixels. FIG. 10A is threshold values for generating the 2×2 dot patterns. FIG. 10B is threshold values for generating the 2×1 dot patterns. The dither mask illustrated in FIGS. 10A and 10B is constituted of an array of 3×3 threshold values, for the sake of ease of understanding. Hereinbelow, in order to identify each of the threshold values in FIGS. 10A and 10B, the horizontal axis of the dither mask is i and the vertical axis is j and the language is that an arbitrary threshold value is (i, j). For example, the threshold value (1, 1) recorded at 1 horizontally and 1 vertically is "140".

In the dither mask illustrated in FIG. 10A, the threshold values are recorded so that each of the values for the threshold values (2, 2), (2, 3), (3, 2), and (3, 3) are each close values. The threshold values (1, 1), (1, 2), (1, 3), (2, 1), and (3, 1) are in turn each close values and have recorded values that are higher than the threshold values (2, 2), (2, 3), and (3, 2). Therefore, in a case where the gradation values for each of the pixels of the designated image data are a value that is not less than the threshold values (2, 2), (2, 3), (3, 2), and (3, 3) and is lower than the threshold values (1, 1), (1, 2), (1, 3), (2, 1), and (3, 1), then 2×2 dot patterns that are on are formed at the threshold values (2, 2) (2, 3), (3, 2), and (3, 3) by when this dither mask is used to apply the halftone process.

In the dither mask illustrated in FIG. 10B, the threshold values are recorded so that each of the values for the threshold values (2, 2) and (2, 3) are close values. In turn, the threshold values (1, 1), (1, 2), (1, 3), (2, 1), (3, 1), (3, 2), and (3, 3) are close values, and have recorded values that are higher than the threshold values (2, 2) and (2, 3). Therefore, in a case where the gradation values for each of the pixels of the designated image data are a value that is higher than the threshold values (2, 2), (2, 3) and is lower than the threshold values (1, 1), (1, 2), (1, 3), (2, 1), (3, 1), (3, 2), and (3,3) then 2×2 dot patterns that are on are formed at the threshold values (2, 2) and (2, 3) by when this dither mask is used to apply the halftone process.

In effect, the dither mask that is applied to the designated image data is a matrix of 3×3 pixels or more. More specifically, the dither mask would include a plurality of patterns of each of the threshold values in FIGS. 10A and 10B.

Therefore, changing the proportion of patterns of each of the threshold values in FIGS. 10A and 10B included in the dither mask makes it possible to change the proportions of the 2×1 dot patterns and the 2×2 dot patterns generated by the dither mask. For example, the threshold values (2, 2) and (2, 3) of the 2×1 dot pattern illustrated in FIG. 10B are set to values not greater than a gradation value (duty) belonging to a first group, and the remaining threshold values are set to values not less than a gradation value belonging to the first group. Therefore, in a case where many gradation values of the pixels belong to this first group, then applying the dither mask makes it possible to generate many of the 2×1 dot pattern. The threshold values (2, 2), (2, 3), (3, 2), and (3, 3) for the 2×2 dot pattern illustrated in FIG. 10A are made to be values not greater than a gradation value (duty) belonging to a second group, and the remaining values are set to values not less than a gradation value belonging to the second group. Therefore, in a case where the gradation values of the pixels of the designated image data include many values belonging to this second group, then applying the dither mask makes it possible to generate many of the 2×2 dot pattern. That is to say, in the dither mask, the proportions of arrangement of the threshold values for generating each of the dot patterns illustrated in FIGS. 10A and 10B are combined in accordance with the corresponding print mode.

The flow proceeds to step S7 in FIG. 7; the ejection control unit 17d performs a process for sorting the halftone data in the order that needs to be transferred to the print head 20. According to this sorting process, there is determination of the time at which each of the dots stipulated by the halftone data is formed by one of the nozzles 21 of one of the nozzle columns, in accordance with the pixel positions thereof and the type of ink. Raster data (one example of halftone data) resulting from this sorting process is sequentially transmitted to the print head 20 by the ejection control unit 17d, and this causes the ejecting of dots from each of the nozzles 21 to be executed. An image is thereby reproduced on the printing substrate on the basis of the halftone data.

Figure 11A:
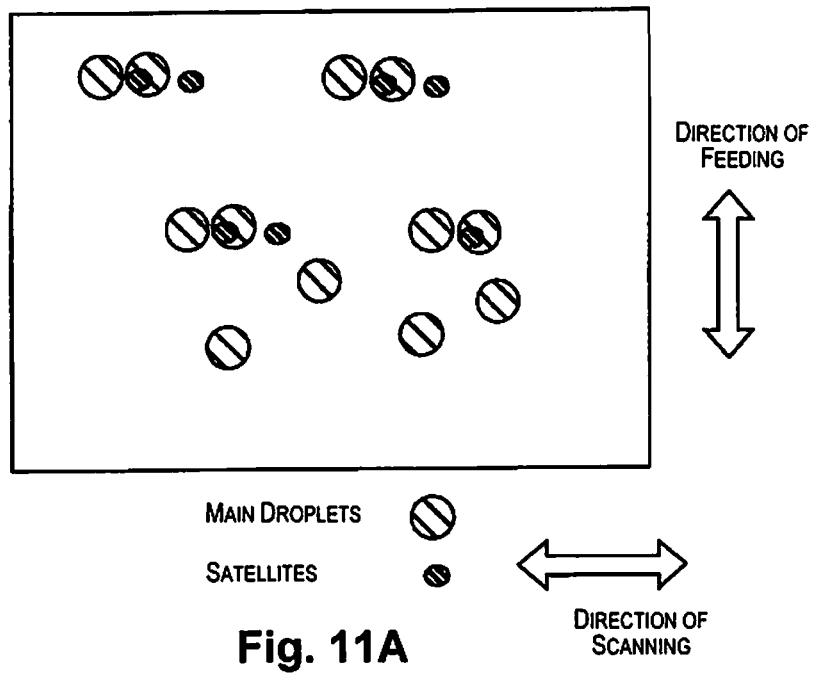
FIG. 11A is an image region constituted of 10×10 pixels where a countermeasure against impact misalignment of the invention has been applied.
Figure 11B:
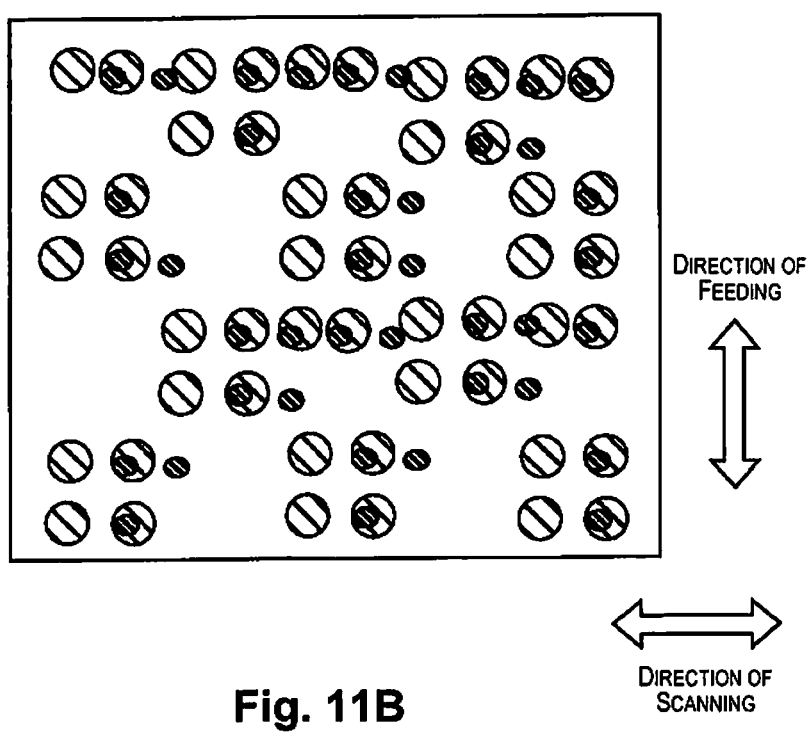
FIG. 11B is an image region constituted of 10×10 pixels where the countermeasure against impact misalignment of the invention has been applied.

FIGS. 11A and 11B illustrate image regions constituted of 10×10 pixels to which the countermeasure against impact misalignment of the invention has been applied. That is to say, the pixels illustrated in FIGS. 11A and 11B illustrate dots that are printed on the basis of a sub-pixel group. FIG. 11A illustrates an image of a case where the duty is 10% (i.e., not more than 20%). FIG. 11B illustrates an image of a case where the duty is 50% (i.e., between 20% and less than 60%). In FIGS. 11A and 11B, the satellites are understood to be occurring because of the separation of the dots.

In the image illustrated in FIG. 11A, many 2×1 dot patterns are generated as patterns having a low dispersiveness of dots. The satellites that are produced by the separation of the ink include some that overlap with any of the dots included in the 2×1 dot patterns. Therefore, a change in the coverage rate caused by the satellites has been curbed. Having there be the 2×1 dot patterns also has curbed worsening of the graininess.

In the image illustrated in FIG. 11B, the 2×1 dot patterns and the 2×2 dot patterns occur as patterns having low dispersiveness of dots. In particular, at this duty of 50%, many of the 2×2 dot patterns occur. The satellites that are produced by the separation of the ink include some that overlap with any of the dots included in the 2×2 or 2×1 dot patterns. Therefore, a change in the coverage rate caused by the satellites has been curbed.

As has been described above, in the first embodiment, the ink that is ejected from the print head 20 is controlled and the proportion of dots that are formed adjacent to one another is modified in accordance with the duty (ejected amount of ink).

Therefore, it is not that dot patterns having low dispersiveness of dots are generated in the range of all duties, as has conventionally been done, but rather print many of the dot patterns having a low dispersiveness of dots in particular only in the range of duty where the changes in coverage rate are greater makes it possible to reduce the factors that degrade the image quality in other ways, such as, for example, adversely affecting the graininess, and makes it possible to effectively reduce the degradation in image quality that is caused by the satellites.

Second Embodiment

Figure 12:
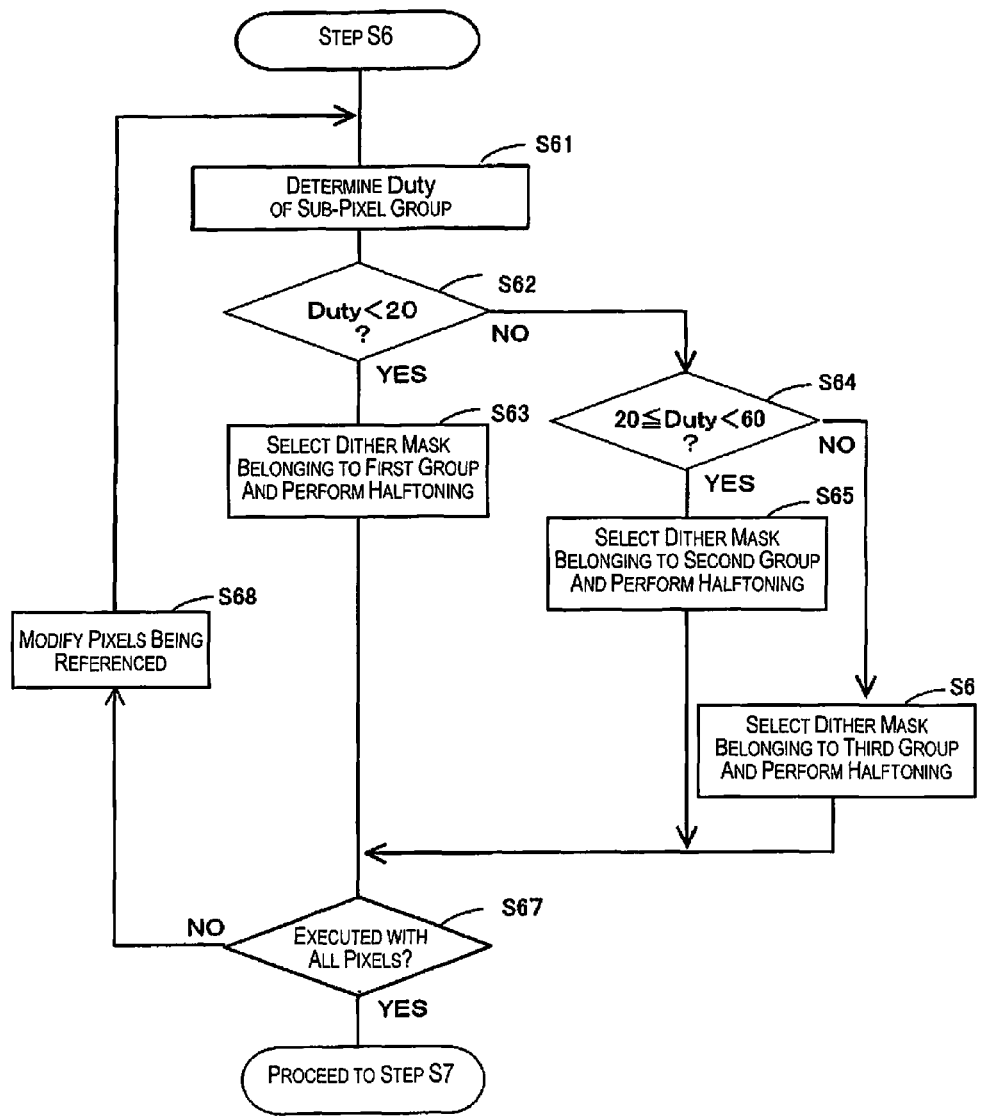
FIG. 12 is a flow chart for illustrating in detail a halftone process that is executed in step S5 of FIG. 7.

FIG. 12 is a flow chart for illustrating in detail a halftone process that is executed in step S6 of FIG. 7, as a modification example. This second embodiment is unlike the first embodiment in the configuration of the halftone processing unit 17c, which selectively uses the dither masks depending on the duty.

First, in step S61, the halftone processing unit 17c determines the duty of a pixel group to which a dither mask is being applied, on the basis of the gradation values designated for each of the pixels. For the sake of ease of description, the pixel group to which the dither mask is being applied is understood to be a sub-pixel group with which the pixels have undergone resolution conversion and been increased, and the pixels included in the sub-pixel group have the same gradation values (duty). Therefore, in the present embodiment, the duty can be determined to be 100% in a case where the gradation values of the original pixels are 255.

It shall be readily understood that any other technique may be used by the halftone processing unit 17c to determine the duty.

The halftone processing unit 17c selects from the ROM 14 a dither mask that belongs to the first through third groups in accordance with the duty determined in step S61, and quantizes the ink amount data while also comparing the threshold values recorded in the acquired dither masks and the gradation values of each of the pixels (steps S62 to S66). Therefore, the consecutive gradation values 0 to 255 belonging to each of the pixels are converted to a value "1", indicative of the presence of a dot, or to a value "0", indicative of the absence of a dot. As in the first embodiment, the ROM 14 records dither masks for reproducing different dot patterns depending on the print mode. For the dither masks corresponding to the same print mode, also, a plurality of dither masks are recorded depending on the duty. That is to say, the amount of occurrence of the 2×1 dot patterns (a first pattern) included in the halftoning and the amount of occurrence of the 2×2 dot patterns (a second pattern) are changed by modifying the dither masks used by the halftone processing unit 17c.

Though a description is omitted, the halftoning process illustrated in the present embodiment is intended to be applied in all of the colors (cyan, magenta, yellow, and black) belonging to the printer 10.

In a case where the duty is less than 20% (the first range) (step S62: YES), then in step S63, the halftone processing unit uses a dither mask belonging to the first group to performing halftoning on the pixel group of the designated image data. The dither mask that belongs to the first group is used in the first range illustrated in FIG. 9; in association with an increase in duty, the 2×1 dot patterns are generated and the 2×2 dot patterns are not generated.

In a case where the duty determined in step S61 is between 20% and less than 60% (the second range) (step S64: YES), then in step S65 the halftone processing unit 17c uses a dither mask belonging to the second group to perform the halftoning on the pixel group of the designated image data. The dither mask belonging to the second group is used in the second range illustrated in FIG. 9; as the duty increases, so too does the amount of occurrence of the 2×2 dot patterns increase. In the modification example 1, the dither mask most increases the amount of occurrence of the 2×2 dot patterns in the range where the duty is 40% to 60%. Therefore, the dither mask belonging to the second group generates many of the 2×2 dot patterns between 40% and 60%, which includes the duty of 50%, where the difference ΔC in the coverage rate illustrated in FIG. 5 becomes highest.

In a case where the duty determined in step S61 is 60% or higher (step S64: NO), then in step S66 the halftone processing unit 17c uses a dither mask belonging to the third group to perform the halftoning on the pixel group. With the dither mask belonging to the third group, the threshold values have been arranged without consideration given to the dispersiveness of the dots. That is to say, any manner of dither mask may be used in this range.

For example, the dither mask belonging to the first group is constituted solely of the arrangement of threshold values for generating the 2×1 dot patterns, illustrated in FIG. 10B. The dither mask belonging to the second group combines, in accordance with the duty values of the pixel groups, the proportion of arrangement of threshold values for generating the 2×2 dot patterns illustrated in FIG. 10A and the proportion of arrangement of threshold values for generating the 2×1 dot patterns illustrated in FIG. 10A.

Returning to FIG. 9, the halftoning process is not performed on all of the pixels (step S67: NO), and therefore the flow proceeds to step S68, and the halftone processing unit moves the range of pixels (pixel group) to which the halftone process is applied. That is to say, the halftone processing unit 17c moves the pixels being referenced to pixels that have not been compared with the dither mask. The flow then returns to step S61, and the series of processes is repeated.

In a case where the halftone processing has been performed on all of the pixels (step S67: YES), however, the halftone processing unit 17c proceeds to step S7 in FIG. 7. Thereafter, the dots are formed on the printing substrate on the basis of the halftone data, as in the first embodiment.

MODIFICATION EXAMPLES

Modification Example 1

The print apparatus 100 need not perform the countermeasure against impact misalignment of dots of the invention on the inks of all the colors, but rather may perform the countermeasure against impact misalignment only on the cyan, magenta, and black inks, excluding the yellow. Yellow ink is brighter and has a lower contrast with the printing substrate compared to the inks of the other colors, and therefore a change in brightness is not high, even when the coverage rate changes, due to impact misalignment. That is to say, with yellow ink it could be said that a change in the coverage rate is less likely to become a difference in brightness, nor is there a major effect in the degradation of image quality.

Therefore, the countermeasure against impact misalignment of the invention is not performed with the yellow ink. Arriving at such a configuration removes the need to use a different dither mask with yellow, and therefore makes it possible to reduce the quantity of dither masks recorded in the ROM 14 or the like. As a result, it is possible to allot the amount of memory of the ROM 14 or the like to other information.

In addition thereto, in a case where the print apparatus has inks for light cyan, light magenta, or and light black, then the configuration may be one where the countermeasure against impact misalignment is not also performed on these inks.

Modification Example 2

The number of dots included in the dot patterns may also be modified according to the types of ink. For example, an ink that has a low viscosity tends to be more susceptible to the separation of dots. Therefore, in a case where an ink having a low viscosity is being used, then, for example, a dither mask that has a higher slope indicative of the proportion of occurrence of the 2×2 dots may be used in the second range that is illustrated in FIG. 9. Dye inks have a lower viscosity than pigment inks do. For this reason, for example, in a case where a dye ink is being used, then a dither mask that has a higher slope indicative of the proportion of occurrence of the 2×2 dots may be used.

Modification Example 3

The print apparatus 100 may be a line printer. A line printer has a line printer head possessing an elongated shape as the print head 20. For this reason, the print head 20 is fixed to a predetermined position inside the printer 10. With the print head 20, the longitudinal direction is the direction that crosses (intersects with) the direction in which the printing substrate is moved (the direction of feeding), and there are provided nozzle columns where nozzles 21 of each of the colors are lined up in the longitudinal direction. The nozzle columns have a length that corresponds to the width of at least a printable region on the printing substrate out of the width of the printing substrate in the longitudinal direction. Also, the nozzle columns are provided for every type of ink that is used by the printer 10.

In the case where the print apparatus 100 is a line printer, then the direction in which the dots are adjacent to one another would be the direction in which the printing substrate is conveyed (the direction of feeding). That is to say, in the 2×1 dot patterns, there would be two dots adjacent to one another in the direction of feeding.

Having the above-described configuration makes it possible to apply the invention in a line printer as well.

Modification Example 4

Figure 13A:
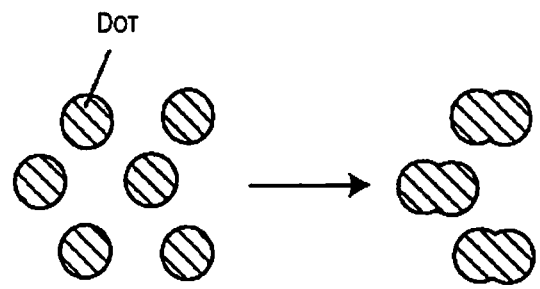
FIG. 13A is a drawing illustrating a countermeasure against impact misalignment of the dots.
Figure 13B:
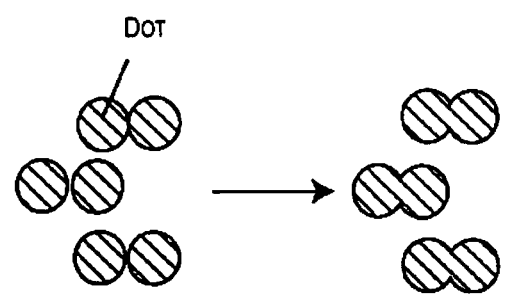
FIG. 13B is a drawing illustrating the countermeasure against impact misalignment of the dots.
Figure 13C:
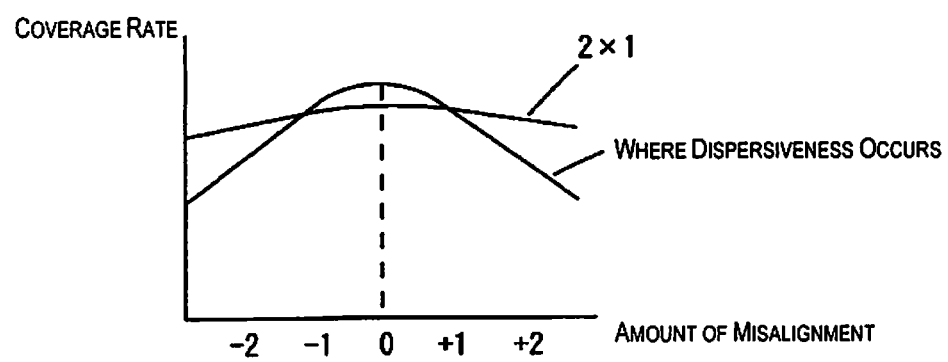
FIG. 13C is a drawing illustrating the countermeasure against impact misalignment of the dots.

The invention has thus far been described as being for curbing the change in coverage rate caused by the satellites. However, the invention also has an effect on the degradation in image quality caused by the impact misalignment of dots. FIGS. 13A-13C are drawings illustrating a countermeasure against impact misalignment of dots. FIG. 13A illustrates impact misalignment that occurs in dispersion-type dots. FIG. 13B illustrates impact misalignment that occurs in dots of a concentrated-dot type (of the 2×1 dot pattern).

In FIGS. 13A and 13B both, the left in the drawing illustrates the ideal dots (of a case where the impact misalignment does not occur) and the right in the drawing illustrates the dots of a case where the impact misalignment does occur.

As illustrated in FIG. 13A, in a case where the dots are formed in a dispersed manner, then when the impact misalignment of dots occurs, the dots overlap with one another and a variation in the coverage rate is produced. As illustrated in FIG. 13B, however, in a case where the dots are formed by the 2×1 dot patterns, then even when the impact misalignment of dots occurs, the variation in coverage rate is not major compared to the case of the dispersed-type dot arrangement. This is because the dots are formed so as to be adjacent to one another from the beginning, and therefore even though the impact misalignment occurs, the proportion where the coverage rate changes is low.

FIG. 13C illustrates a graph of a case where the horizontal axis is the amount of misalignment in the impact misalignment of the dots and the vertical axis is the coverage rate of the dots. In FIG. 13C, "0" is the reference in the horizontal axis; a case where a dot is misaligned to the right-side direction in the drawing is "+", and a case where a dot is misaligned to the left-side direction in the drawing is "−". As illustrated in FIG. 13C, at (misalignment amount 0) where misalignment of the dots does not occur, then the 2×1 dot patterns have a lower coverage rate than the dispersed-type dot patterns. However, as described above, with the 2×1 dot patterns, the amount of change (amount of decreases) in the coverage rate is smaller than the dispersed-type dot patterns even when the amount of misalignment changes to the plus side or to the minus side.

For this reason, having the dots for forming the image include many of the 2×1 dot patterns makes it possible to curb the degradation in image quality caused by the impact misalignment of the dots. Though a description is omitted, a similar effect is also produced against the impact misalignment of the dots with the 2×2 dot patterns as well.

It shall be readily understood that the invention is not to be limited to the embodiments above.

Namely, the mutually replacement members, configurations, and the like disclosed in the embodiments and examples can be applied with the combinations thereof modified as appropriate.

Members, configurations, and the like that are known features and can be substituted with the members, configurations, and the like disclosed in the embodiments and examples may be substituted as appropriate, and may applied with the combinations modified.

There may be substitution as appropriate with members, configurations, and the like which, on the basis of known art and the like, a person skilled in the art could envisage as substitutions for the members, configurations, and the like disclosed in the embodiments and examples, and same may be applied with the combinations modified.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A print apparatus comprising:
a print head provided with nozzles that are configured to eject an ink onto a printing substrate, the print head being configured to record dots onto the printing substrate in accordance with movement of at least one of the print head and the printing substrate;
a memory storing at least a first group and a second group each of which includes dither masks according to ejected amount of ink, the dither masks of the first group being different from the dither masks of the second group in that a proportion at which dots are formed adjacent to one another relative to the ejected amount of the ink is different; and
a print control unit configured to perform a control for ejecting droplets of the ink from the nozzles in a first print mode and a second print mode, the number of the droplets per unit time in the first print mode being lower than the number of the droplets per unit time in the second print mode,
the print control unit being configured to determine in which of the first and second modes the ejecting is controlled,
in response to determining that the ejecting is controlled in the second print mode, the print control unit being configured to determine what range the ejected amount of the ink is within, configured to select a dither mask of the first group when determining the ejected amount of the ink is within a first range to perform the control for the ejecting, and configured to select a dither mask of the second group when determining the ejected amount of the ink is within a second range greater than the first range to perform the control for the ejecting.

2. The print apparatus as set forth in claim 1, wherein the print control unit increases the proportion of dots that are formed adjacent to one another as the ejected amount of ink becomes higher at the ejected amount of the ink from 40% to 60%, which is within the second range.

3. The print apparatus as set forth in claim 1, wherein a form of the dots being adjacent to one another is a dot column where two or more dots are adjacent to one another in a predetermined direction.

4. The print apparatus as set forth in claim 3, wherein the print apparatus is a serial printer, and
the predetermined direction is a direction in which the print head moves reciprocally.

5. The print apparatus as set forth in claim 4, wherein the print control unit executes, during controlling the ejecting in the first print mode, causing the dot column arrayed in a direction in which the print head moves reciprocally to be recorded in a plurality of scans, and the print control unit executes, during controlling the ejecting in the second print mode, causing the dot column arrayed in the direction in which the print head moves reciprocally to be recorded in a single scan, and in a case of performing recording where the ejected amount of ink is between 40% and 60%, which is within the second range, the print control unit increases the proportion at which the dots are formed adjacent to one another in a case where the second print mode is being executed compared to a case where the first print mode is being executed.

6. The print apparatus as set forth in claim 5, wherein in a case where the second print mode is being executed, the print control unit uses a dither mask with which threshold values are recorded that are different from threshold values recorded in a dither mask used in a case where the first print mode is being executed.

7. The print apparatus as set forth in claim 3, wherein the print apparatus is a line printer, and the predetermined direction is a direction in which the printing substrate is conveyed.

8. The print apparatus as set forth in claim 1, wherein the first range is a range less than 20% of the ejected amount of the ink.

9. A print method for causing a print head provided with nozzles and a printing substrate to move relatively, ejecting an ink from the nozzles, and recording dots onto the printing substrate, the print method comprising:

storing at least a first group and a second group each of which includes dither masks according to ejected amount of ink, the dither masks of the first group being different from the dither masks of the second group in that a proportion at which dots are formed adjacent to one another relative to the ejected amount of the ink is different;

performing a control for ejecting droplets of the ink from the nozzles, by a print control unit in a first print mode and a second print mode, the number of the droplets per unit time in the first print mode being lower than the number of the droplets per unit time in the second print mode; and determining in which of the first and second modes the ejecting is controlled, in response to determining that the ejecting is controlled in the second print mode, determining what range the ejected amount of the ink is within, selecting a dither mask of the first group when determining the ejected amount of the ink is within a first range to perform the control for the ejecting, and selecting a dither mask of the second group when determining the ejected amount of the ink is within a second range greater than the first range to perform the control for the ejecting.

10. A serial printer comprising:

a print head provided with nozzles that are configured to eject an ink onto a printing substrate, the print head being configured to be controlled to move relatively with respect to the printing substrate and record dots onto the printing substrate;

a memory storing at least a first group and a second group each of which includes dither masks according to ejected amount of ink, the dither masks of the first group being different from the dither masks of the second dither masks in that a proportion at which dots are formed adjacent to one another relative to the ejected amount of the ink is different; and a print control unit configured to execute at least a first print mode for causing a dot column arrayed in a direction in which the print head moves reciprocally to be recorded in a plurality of scans, and a second print mode for causing a dot column arrayed in the direction in which the print head moves reciprocally to be recorded in a single scan, and in a case of performing recording where the ejected amount of ink is between 40% and 60%, the print control unit being configured to increase a proportion at which the dots are formed adjacent to one another in a case where the second print mode is being executed compared to a case where the first print mode is being executed, the print control unit being further configured to, when the second print mode is executed, determine what range the ejected amount of the ink is within, configured to select a dither mask of the first group when determining the ejected amount of the ink is within a first range to perform the control for the ejecting, and configured to select a dither mask of the second group when determining the ejected amount of the ink is within a second range, which is greater than the first range and includes 40% and 60%, to perform the control for the ejecting.

* * * * *